Dec. 29, 1925.
H. A. SALSBURG
1,567,621
DEVICE FOR APPLYING NONSKID CHAINS TO TIRES
Filed June 5, 1925
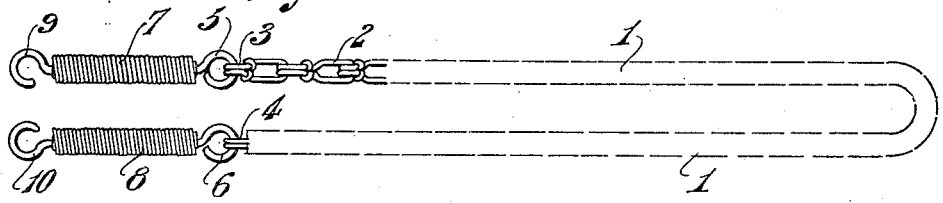
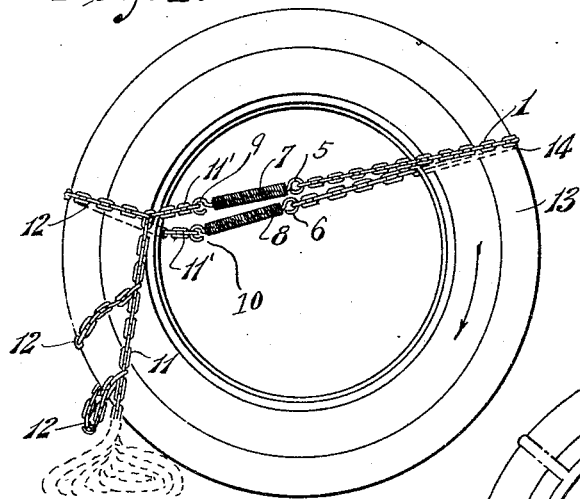
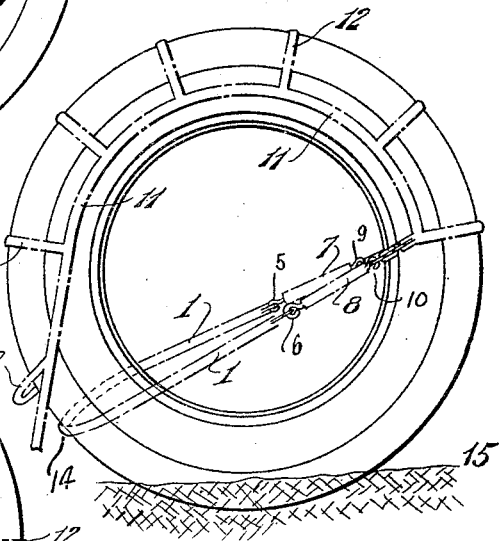
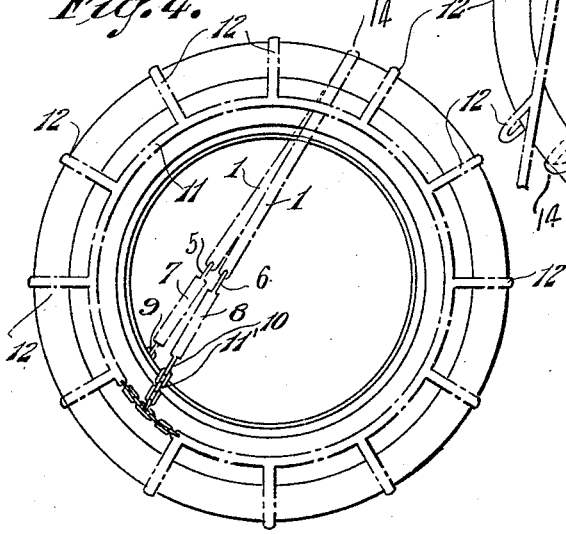
INVENTOR,
Harry A. Salsburg,
BY
Harry W. Bown.
ATTORNEY.

Patented Dec. 29, 1925.

1,567,621

UNITED STATES PATENT OFFICE.

HARRY A. SALSBURG, OF PITTSFIELD, MASSACHUSETTS.

DEVICE FOR APPLYING NONSKID CHAINS TO TIRES.

Application filed June 5, 1925. Serial No. 35,078.

*To all whom it may concern:*

Be it known that I, HARRY A. SALSBURG, a citizen of the United States, residing at Pittsfield, in the county of Berkshire and State of Massachusetts, have invented new and useful Improvements in Devices for Applying Nonskid Chains to Tires, of which the following is a specification.

This invention relates to improvements in devices for applying a non-skid chain to the tire of a motor vehicle. Broadly it comprises a chain member made up of links, each of the ends of which are attached to a coiled spring, and the ends of each of the springs have connected thereto a hook, which hooks are designed to be connected to two of the ends of the side chains of the non-skid chain. The intermediate portion of the device is then looped over the outer tread surface of the tire of a motor vehicle on which the non-skid chain is to be placed, the springs of the device being placed under sufficient tension, whereby the ends of the non-skid chain are firmly and temporarily retained in place on the tire of the wheel. The wheel is then rotated by the motor of the vehicle, and, as the wheel is rotated the non-skid chain is gradually carried over or around the surface of the tire until the ends are brought close together. At the present time it has been found to be a difficult matter to apply a non-skid chain to the tire especially if the wheel is partially embedded in the soft earth or snow, without jacking up the wheel. This is more or less of a difficult matter to carry out. The present device has been developed for the purpose of applying the chain without jacking up the wheels of a motor vehicle. In other words, the device is for temporarily retaining the chain on the wheel while being applied.

Referring to the drawings:

Fig. 1 is a plan view of the device showing the tension springs at the ends of the hooks that are attached to the ends of the chain.

Fig. 2 is a side elevational view showing the initial step in applying the chain to the wheel.

Fig. 3 is a view similar to Fig. 2 showing the chain partially applied and temporarily retained in place during the operation.

Fig. 4 is a similar view showing the completion of the operation of applying the chain.

Referring to the drawings in detail:

1 designates the center portion of the device which is preferably formed of links indicated at 2. The two end links 3 and 4 are attached to the eyes 5 and 6; and attached to the eyes are the tension springs 7 and 8. Connected to the outer ends of these springs are the hooks 9 and 10. The non-skid chain is made up of the usual side chains indicated at 11 and the cross chains 12. The free ends of the side chains are attached to the hooks 9 and 10. The portion 1 is then looped over the tire 13 as indicated at 14. This operation places the springs 7 and 8 under tension causing the links 2 to firmly grip the outer surface of the tire 13. The wheel as a whole is then rotated by the vehicle motor causing the chain to be carried around by the wheel and assume the positions shown in Fig. 3. Upon further rotation of the wheel the ends 11' of the side chains 11 will be brought close together as shown in Fig. 4, when the ends 11' are connected before the device is removed by detaching the hooks 9 and 10. The ends of the side chain are then connected together. It is to be understood that the length of the device shown in Fig. 1 is such that the springs 7 and 8 are placed under sufficient tension to frictionally retain the device in place on the wheel. This device is especially designed for placing the chains on the wheel in the event that they are partially embedded in soft earth or snow as indicated by the line 15. The rotation of the wheel will carry the ends of the chain under the wheel in the position shown in Fig. 4.

From this description it will be seen that I have provided a simple and convenient means of applying non-skid chains to a motor vehicle wheel, and one that occupies only a small space when not in use and may be produced at small expense.

What I claim is:

A device for the purpose described comprising a flexible member, each of the ends of which is fixedly connected to a separate tension device, said tension devices being each provided with a hook at its outer end, whereby the device may be applied to the wheel of a motor vehicle by looping the flexible member over the tread of the wheel, and the hooks are attached to two of the free ends of the side chains, the construction and arrangement being such that each of the spring devices is placed under tension when in use.

HARRY A. SALSBURG